United States Patent [19]
Gilbert et al.

[11] Patent Number: 6,106,122
[45] Date of Patent: Aug. 22, 2000

[54] REAR VIEW MIRROR

[75] Inventors: Robert William Gilbert, Willunga; Garry Gordon Leslie Fimeri, Morphett Vale; Ingmar Manfred Birgden, Glenalta, all of Australia

[73] Assignee: Britax Rainsfords Pty. Ltd., Lonsdale, Australia

[21] Appl. No.: 09/366,109

[22] Filed: Aug. 2, 1999

[51] Int. Cl.$^7$ .............................. G02B 5/08; G02B 7/182; B60R 1/06

[52] U.S. Cl. .......................... 359/841; 359/872; 359/873; 359/877; 248/478; 248/480; 248/481; 248/900

[58] Field of Search ...................................... 359/841, 872, 359/873, 874, 877; 248/477, 478, 479, 480, 481, 900

[56] References Cited

U.S. PATENT DOCUMENTS

| | | | |
|---|---|---|---|
| 3,628,862 | 12/1971 | Stephenson . | |
| 4,502,759 | 3/1985 | Herzog et al. . | |
| 4,626,085 | 12/1986 | Suzuki . | |
| 4,893,916 | 1/1990 | Sakuma et al. . | |
| 4,969,727 | 11/1990 | Harloff et al. . | |
| 5,059,014 | 10/1991 | Mittelhauser et al. | 359/841 |
| 5,477,390 | 12/1995 | Boddy et al. | 359/877 |
| 5,557,476 | 9/1996 | Oishi | 359/872 |

FOREIGN PATENT DOCUMENTS

| | | |
|---|---|---|
| 0272047 B1 | 4/1992 | European Pat. Off. . |
| 0392721 B1 | 6/1993 | European Pat. Off. . |
| 0860323 A2 | 8/1998 | European Pat. Off. . |
| 2204544 | 11/1988 | United Kingdom . |
| 2213445 | 8/1989 | United Kingdom . |

*Primary Examiner*—Ricky D. Shafer
*Attorney, Agent, or Firm*—Jones, Day, Reavis & Pogue

[57] ABSTRACT

A rear view mirror assembly comprising a bracket adapted to be mounted on a vehicle body, and a case, in which a reflective member is pivotally mounted. A lead screw is mounted in the bracket. A pair of arms projecting laterally from the reflective member beyond the periphery thereof and have ridge formations which engage with the lead screw so that rotation of the lead screw causes angular movement of the reflective member.

21 Claims, 7 Drawing Sheets

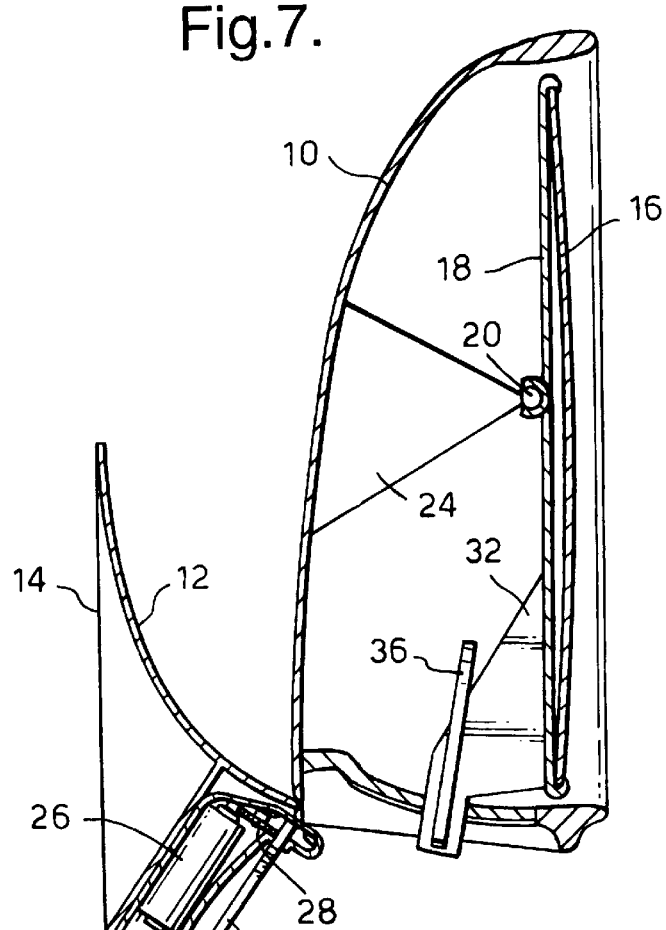
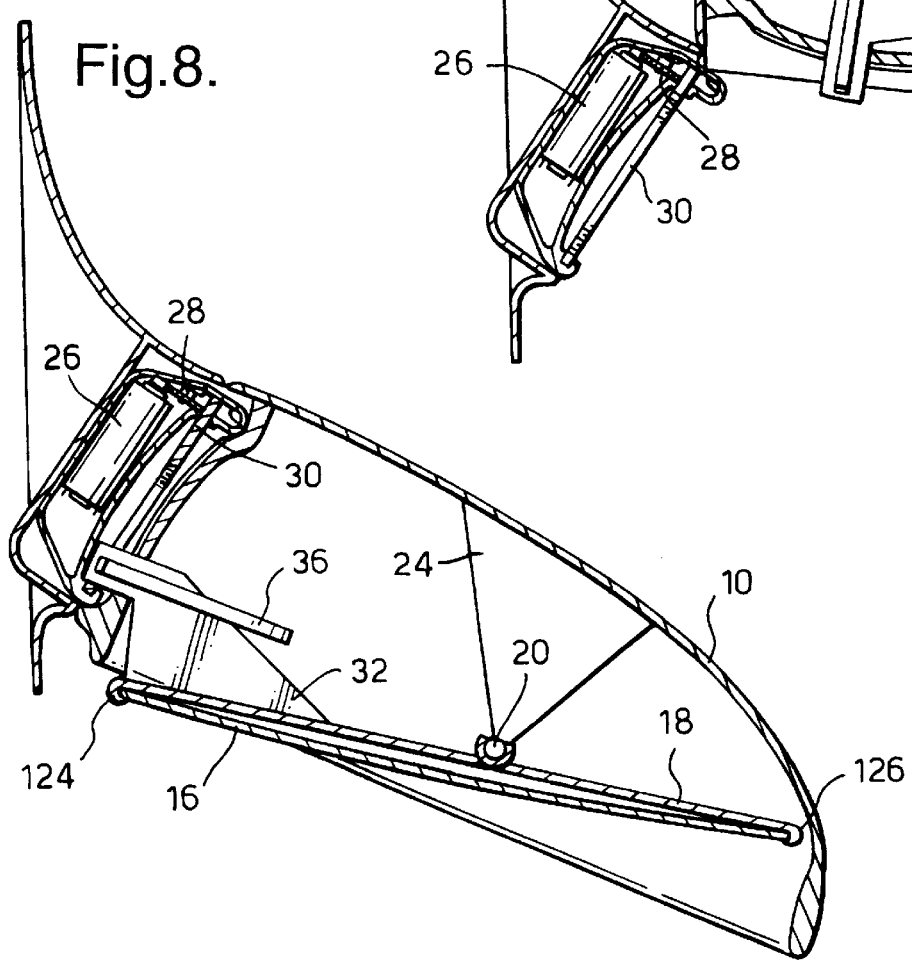

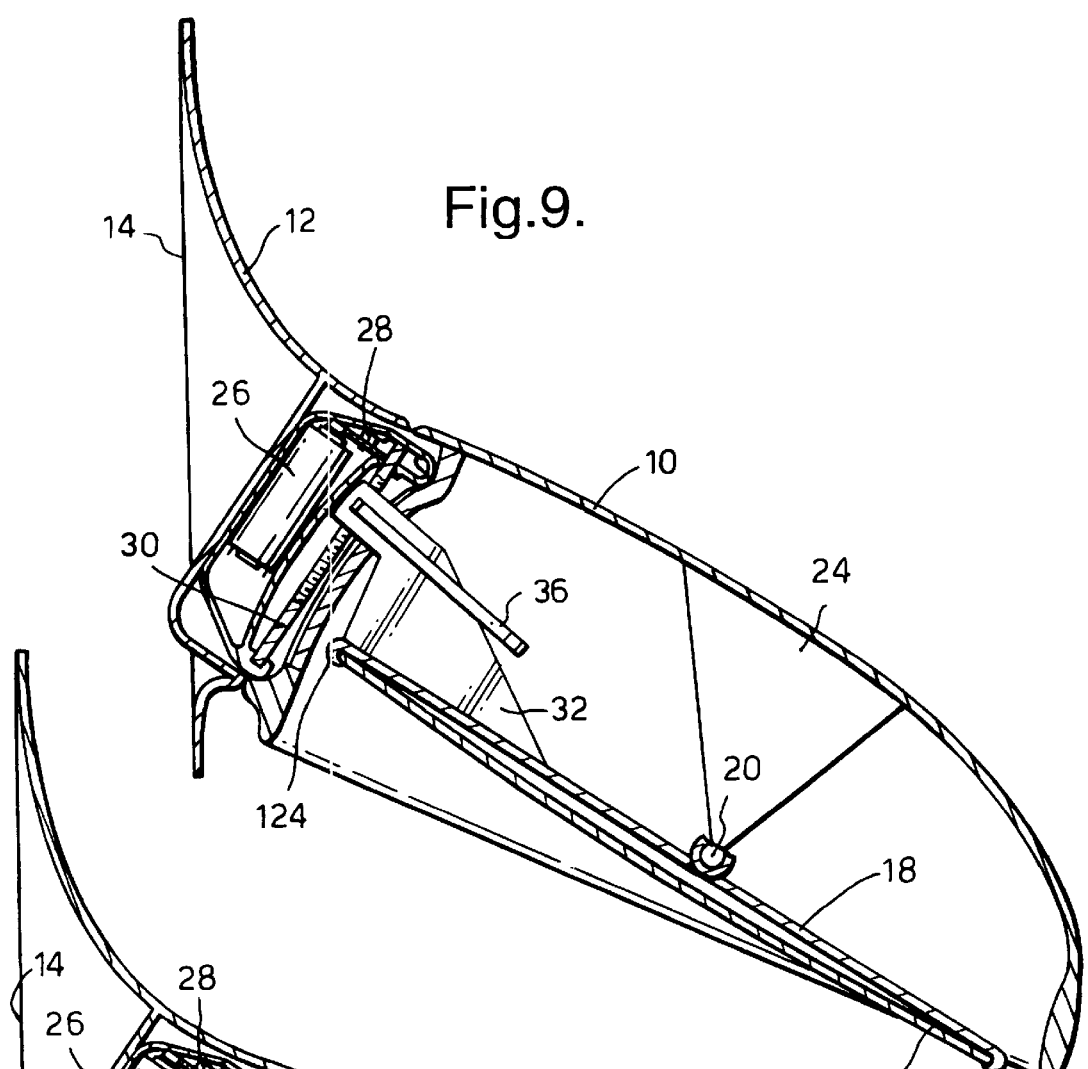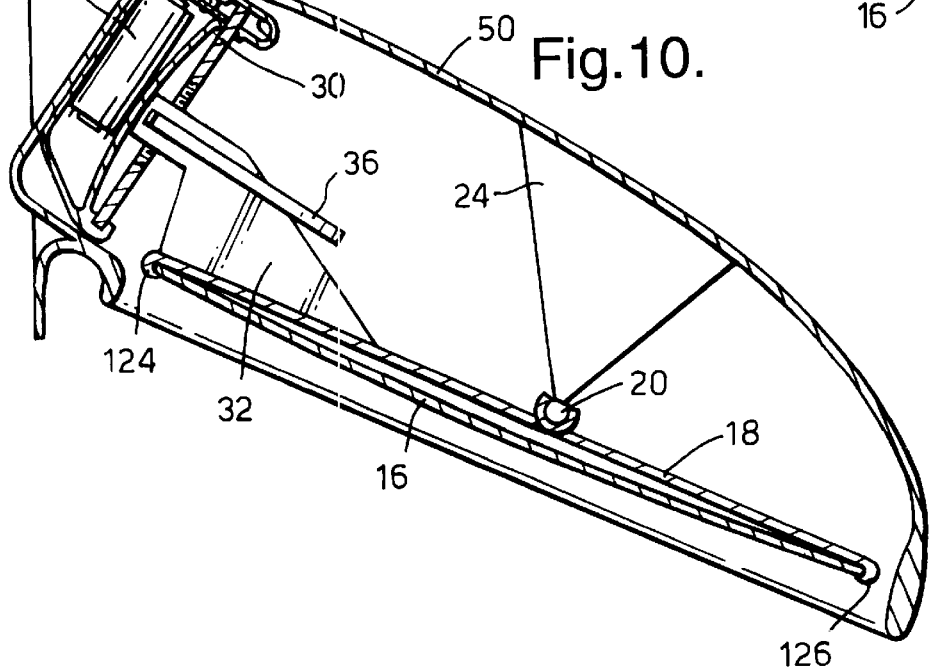

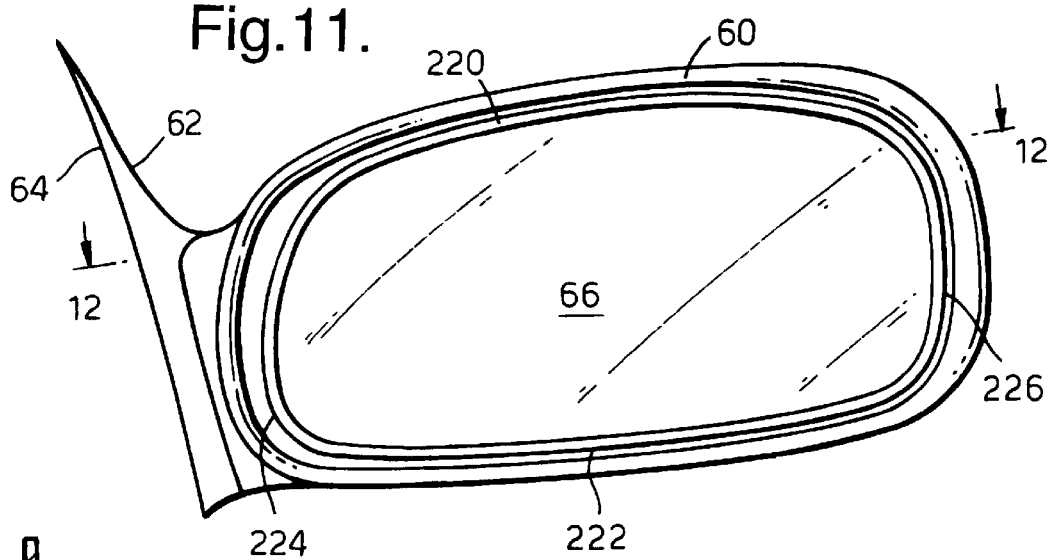
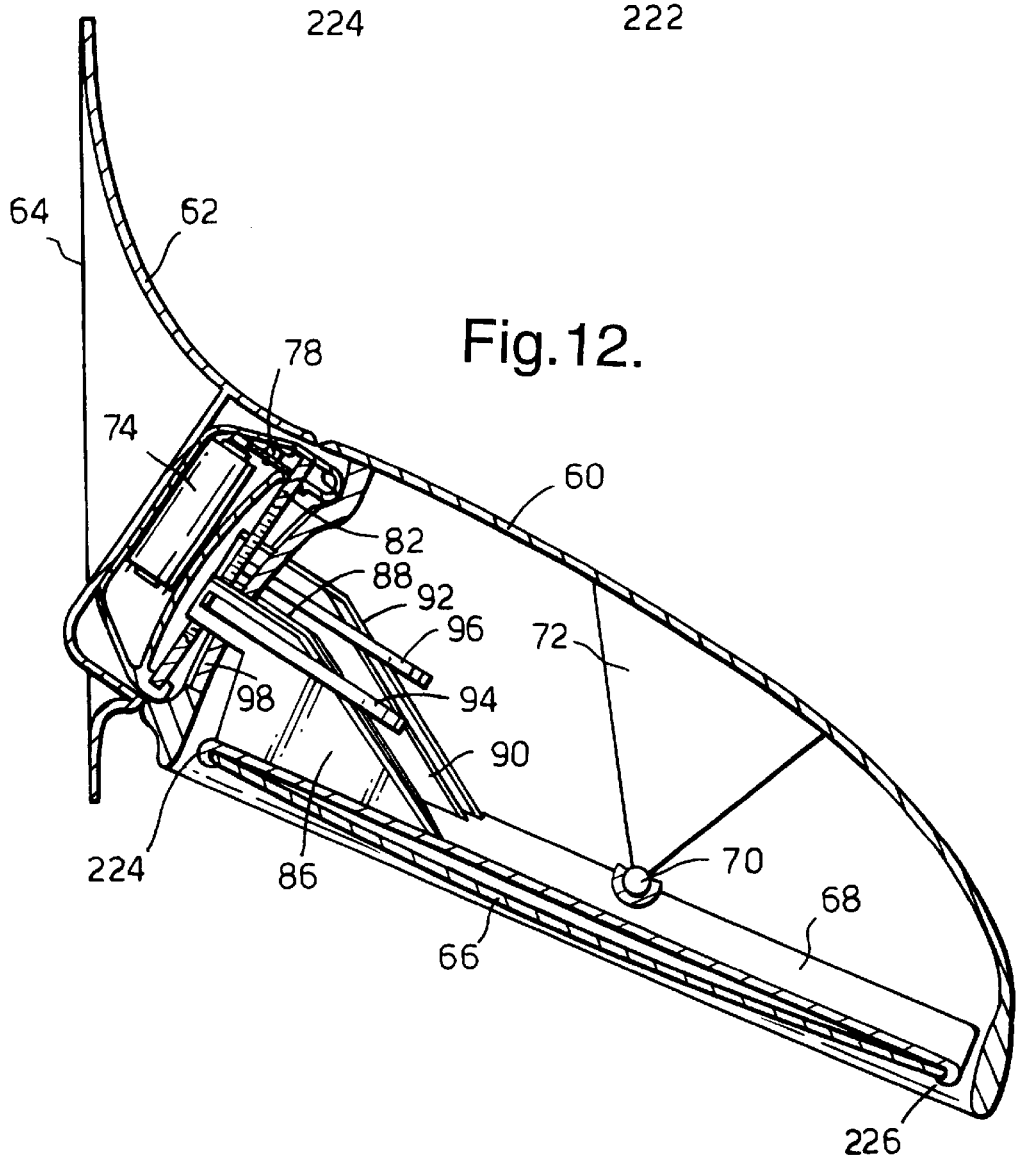

REAR VIEW MIRROR

FIELD

This invention relates to a rear view mirror assembly comprising a bracket adapted to be mounted on a vehicle body, a case, a reflective member mounted in the case for angular movement relative thereto about a predetermined range and a drive unit for effecting angular movement of the reflective member relative to the case.

The invention is applicable both to rear view mirror assemblies of the type in which the case is rigidly mounted on the bracket and to mirror assemblies of the type in which the case is pivotally mounted on the bracket so as to be displaceable from its position of normal use, for example when subject to impact, for example as described in EP-A-0392721.

RELATED ART

In known mirror assemblies of this type, substantially all of the drive means is located within the case behind the reflective member (i.e. on the opposite side thereof from which the mirror is viewed by the user). For example, EP-A-0272047 discloses a mirror of this type in which two electric motors are mounted behind the reflective member and coupled thereto by respective screw jack drives. EP-A-0860323 discloses a similar mechanism in which a single motor and screw jack drive is used to vary the angular position of a reflective member about a single axis. In both cases, the motor or motors and their associated drives make a significant contribution to the weight of the mirror case and therefore increase the extent to which the mirror assembly is liable to vibrate. It is an object of the present invention to provide a mirror assembly of the type described above in which at least part of the drive mechanism is located in the mirror bracket so as to be closer to the location at which the mirror assembly is mounted on the vehicle body.

SUMMARY OF THE INVENTION

According to the invention, in a mirror assembly of the type described above, the drive unit comprises a lead screw mounted in the bracket with its axis oriented in a direction having a component perpendicular to the plane of the reflective member when said reflective member is in the middle of its range of movement, rotary drive means for causing rotation of the lead screw, an arm projecting laterally from the reflective member beyond the periphery thereof and a ridge formation on the arm arranged to engage with the lead screw so that rotation of the lead screw causes angular movement of the reflective member.

BRIEF DESCRIPTION OF THE DRAWINGS

FIG. 7 is a cross-sectional view, similar to FIG. 2, showing the mirror case displaced from its normal position towards the front of the vehicle;

FIG. 8 is a cross-sectional view, similar to FIG. 2, but showing the reflective member of the mirror in its maximum outwardly tilted position;

FIG. 9 is a cross-sectional view, similar to FIG. 2, but showing the reflective member in its maximum inwardly tilted position;

FIG. 10 is a cross-sectional view, similar to FIG. 2, of a rear view mirror assembly in accordance with a second embodiment of the invention;

FIG. 11 is an elevational view from the rear of a vehicle showing a rear view mirror assembly in accordance with a third embodiment of the invention;

FIG. 12 is a cross-sectional view, taken on the line 12—12 in FIG. 10;

DETAILED DESCRIPTION OF THE PREFERRED EMBODIMENTS

Figure 1:
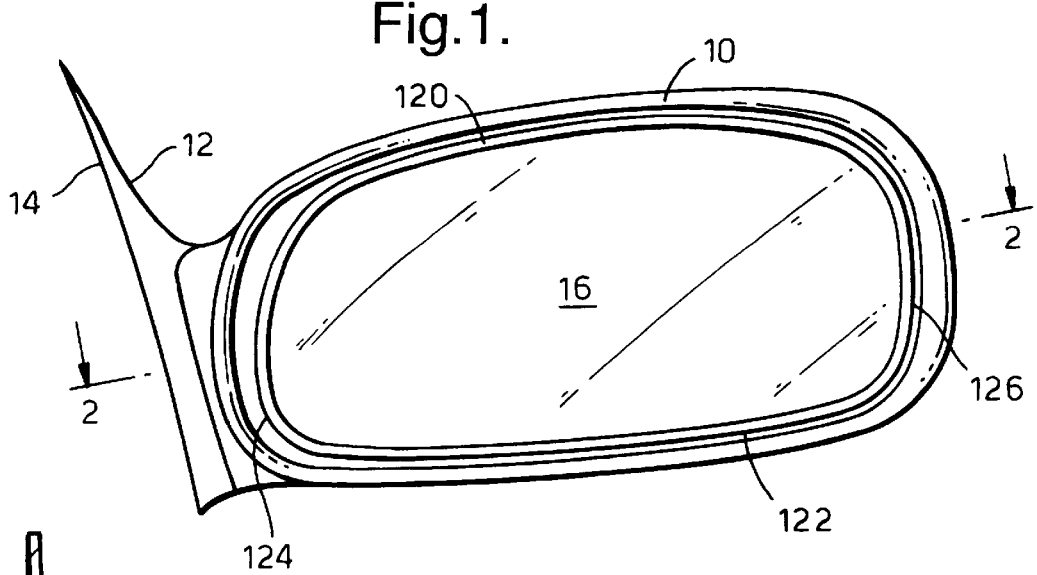
FIG. 1 is an elevational view from the rear of a vehicle showing rear view mirror assembly in accordance with a first embodiment of the invention.
Figure 2:
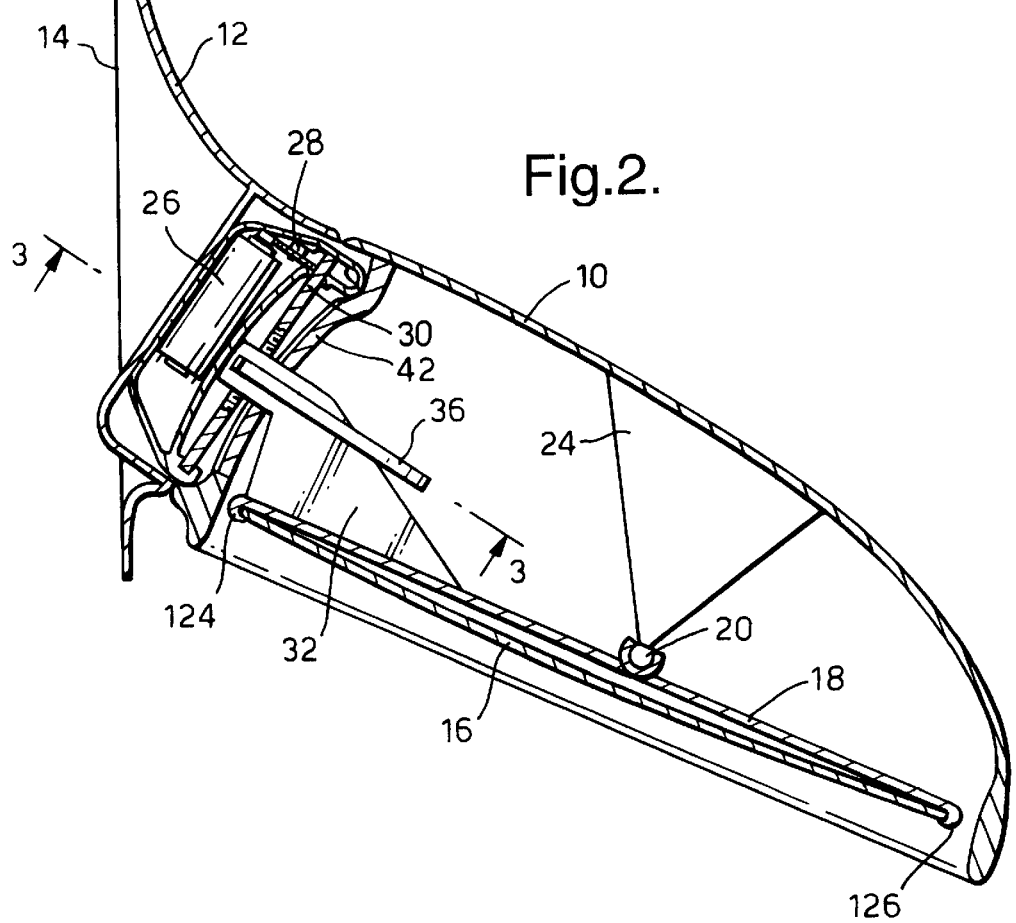
FIG. 2 is a cross-sectional view taken on the line 2—2 in FIG. 1.
Figure 3:
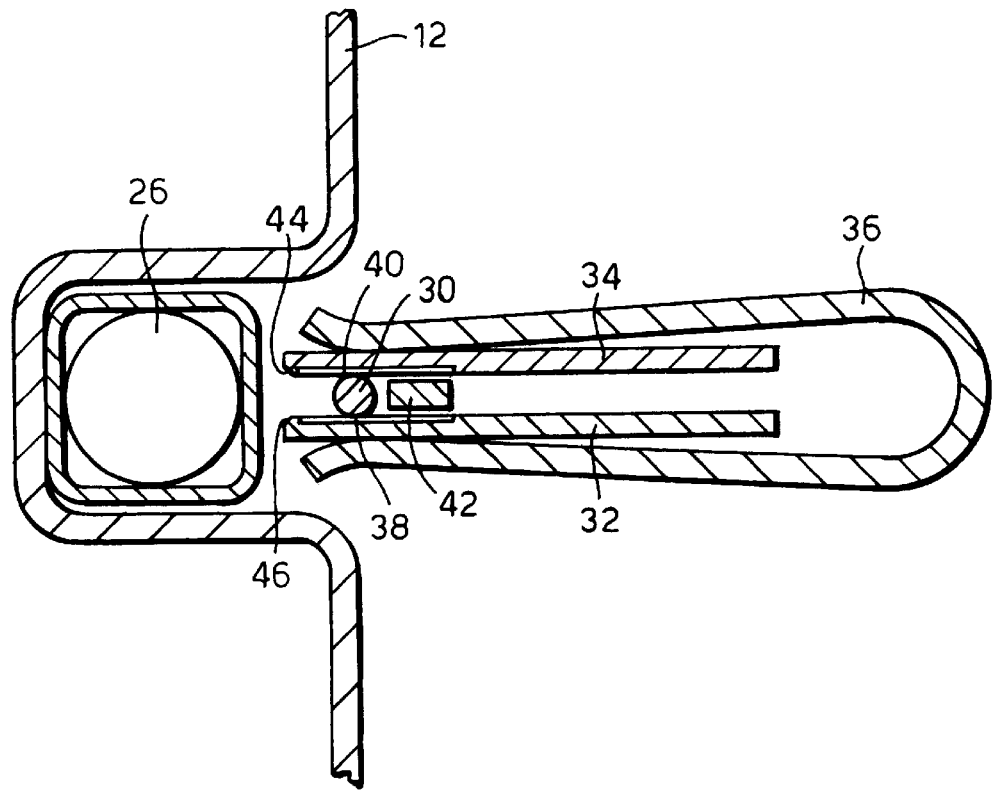
FIG. 3 is a partial cross-sectional view taken on the line 3—3 in FIG. 2.
Figure 4:
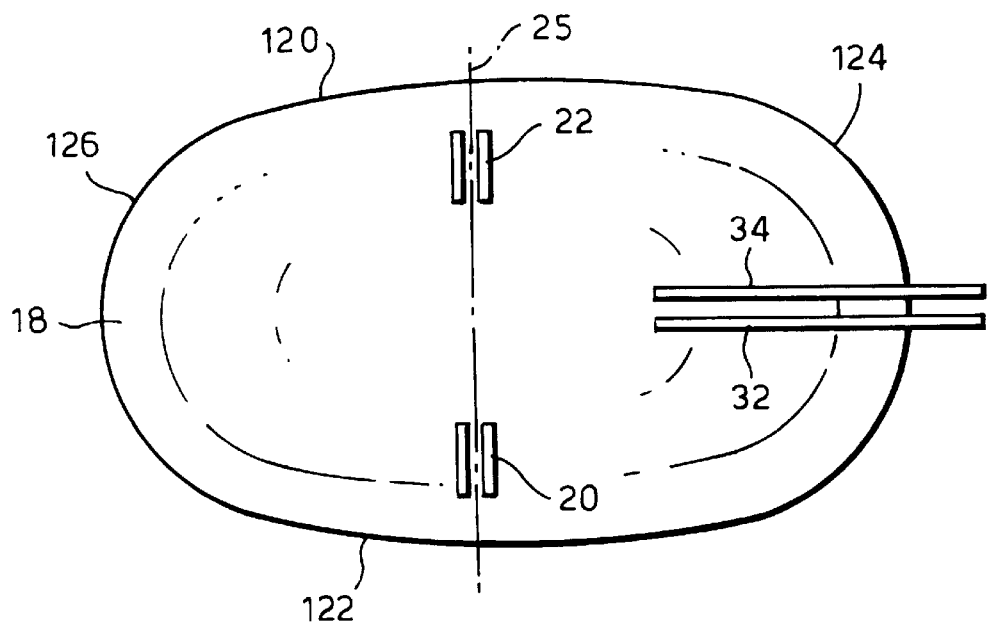
FIG. 4 a rear elevational view of a mirror glass carrier used in the mirror assembly of FIG. 1, as viewed in a direction from the front of the vehicle FIG. 5 a cross-sectional view, similar to FIG. 2 but showing the mirror case displaced from its normal orientation towards the rear of the vehicle.

Referring to FIGS. 1 to 4, a rear view mirror has a case 10 mounted on a bracket 12 which has an inner face 14 adapted to abut a motor vehicle body (not shown). The case 10 is connected to the bracket 12 by a mechanism allowing relative angular movement in the fore and aft direction, as described in EP-A-0392721, the disclosure of which is hereby incorporated herein by reference. A reflective member 16, for example silvered glass, is mounted on a mirror carrier 18, which is coupled to a support member 24 within the case 10 by hinges 20 and 22, both of which are shown in FIG. 4 while only hinge 20 is visible in FIGS. 2, 5, 9 and 10. The hinges 20 and 22 allow angular movement of the mirror carrier 18 about an inclined axis 25 shown in FIG. 4, the orientation of which is determined in the manner described in EP-A-0860323.

An electric motor 26 is mounted within the bracket 12 and has its output shaft coupled by a reduction gear 28 to a lead screw 30 which is mounted with its axis lying in the plane of separation between the case 10 and the bracket 12 when the former is pivoted forwardly or rearwardly, as described above.

Referring to FIGS. 2 and 3, the mirror carrier 18 has a pair of mutually parallel arms 32 and 34 projecting rearwardly and laterally so that their ends embrace the lead screw 30 and are urged into contact therewith by a U-shaped spring 36. The confronting faces of ends of the arms 32 and 34 have grooved regions 38 and 40 of the same pitch as the lead screw 30. Consequently, when the lead screw 30 is rotated by the motor 26, the arms 32 and 34 are displaced longitudinally along the lead screw 30, causing the mirror carrier 18 to pivot about the axis 25 of the hinges 20 and 22 shown in FIG. 4. The lead screw thread is of fine pitch and open angle form (for example 0.5 mm pitch and 45° flank angle). Consequently, if the mirror carrier 18 is subject to a force tending to displace it about the axis 25, the grooved regions 38 and 40 of the arms 32 and 34 can jump over the thread of the lead screw 30 against the action of the spring 34, thereby avoiding damage to the mechanism and allowing manual adjustment of the reflective member 16 in the event of motor drive failure.

Figure 5:
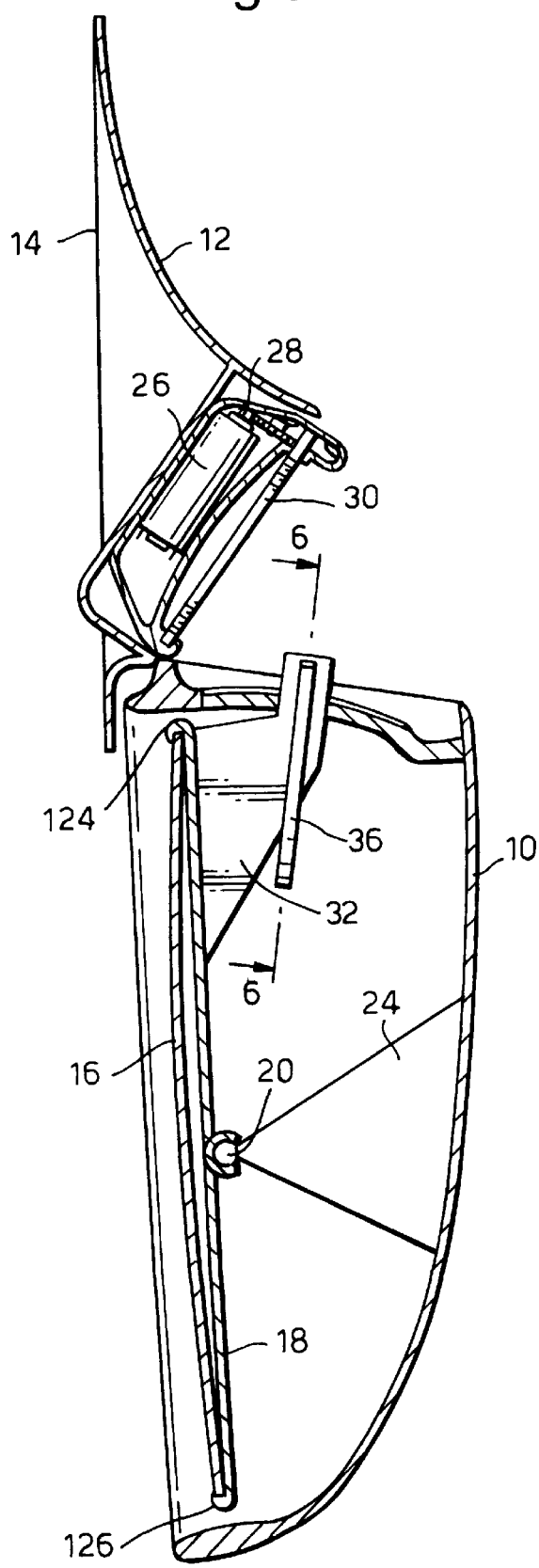

When the case 10 is subject to a force tending to displace it from its normal position, shown in FIG. 2, towards the rear of the vehicle, it pivots to the position shown in FIG. 5. The arms 32 and 34 have disengaged from the lead screw 30 and are urged into engagement with a stop bar 42 (see FIGS. 3 and 6) on the case 10 which extends parallel and adjacent to the lead screw 30 when the case 10 is in its normal position. The stop bar 42 has grooved formations of the same pitch as the lead screw on its surfaces facing the grooved regions 38 and 40 of the arms 32 and 34. As the grooved regions 38 and 40 disengage from the lead screw 30, they come into engagement with the groove formations on the stop bar 42 so as to hold the mirror carrier 18 in the orientation to which it had been set immediately prior to disengagement. As the case 10 is restored to its normal position, ramp surfaces 44 and 46 on the ends of the arms 32 and 34 engage with lead screw 30 to force the arms 34 and 36 apart, against the action of the spring 36, so that the grooved regions 38 and 40 come into engagement with the thread of the lead screw 30 as they disengage from the groove formations on the stop bar 42. The bar 42 effectively forms a keeper to inhibit movement of the mirror relative to the case when the arms are disengaged from the screw.

FIG. 7 shows the case 10 displaced forwardly from its normal position. The arms 32 and 34 disengage from the lead screw 30, and re-engage therewith when the case 10 is restored to its normal position, in the same manner as described with reference to FIGS. 5 and 6.

FIG. 8 shows the mirror assembly with the case 10 in its normal position and the mirror carrier 18 driven by the lead screw 30 to its maximum outwardly directed orientation. FIG. 9 shows the mirror carrier 18 displaced to its maximum inward facing orientation.

FIG. 10 shows a second embodiment of the invention in which the separate mirror case 10 and bracket 12 are replaced by a single combined case 50 which is rigidly fixed to the vehicle body. Since there is no displaceable case, the arms 32 and 34 do not disengage from the lead screw 30. Consequently, there is no stop bar equivalent to the stop bar 42 of the first embodiment. Otherwise, the mechanism is as described with reference to FIGS. 1–4, corresponding parts being denoted by the same reference numerals.

FIGS. 11 to 14 show another rear view mirror having a case 60 mounted on a bracket 62 which has an inner face 64 adapted to abut a motor vehicle body (not shown). As with the embodiment of FIGS. 1 to 4, the case 60 is connected to the bracket 62 by a mechanism allowing relative angular movement in the fore and aft direction. A reflective member 66 is mounted on a mirror carrier 68 which differs from the mirror carrier of FIGS. 1 to 4 in that it is coupled by a ball and socket joint 70 to a support member 72 so as to allow angular movement of the mirror carrier 68 about both vertical and horizontal axes that may be referred to as first and second orthogonal axes.

Figure 14:
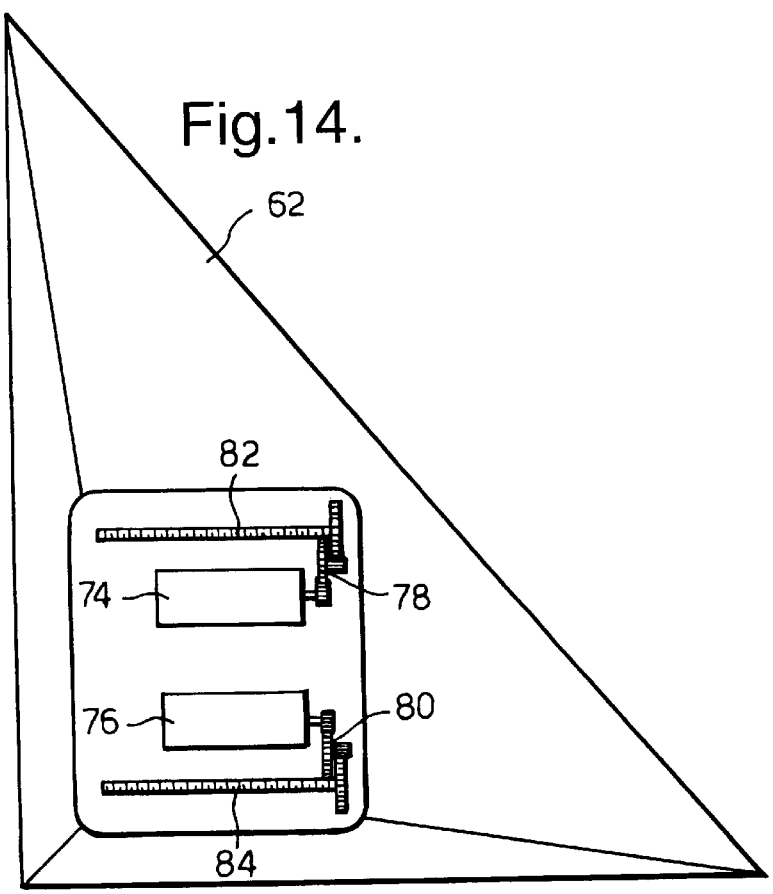
FIG. 14 is a side view of the bracket of the embodiment shown in FIGS. 11 and 12, with the case removed.

As can best be seen in FIG. 14, two electric motors 74 and 76 are mounted within the bracket 62, each having its output shaft coupled by a respective reduction gear 78, 80 to a respective upper and lower lead screw 82, 84.

Figure 13:
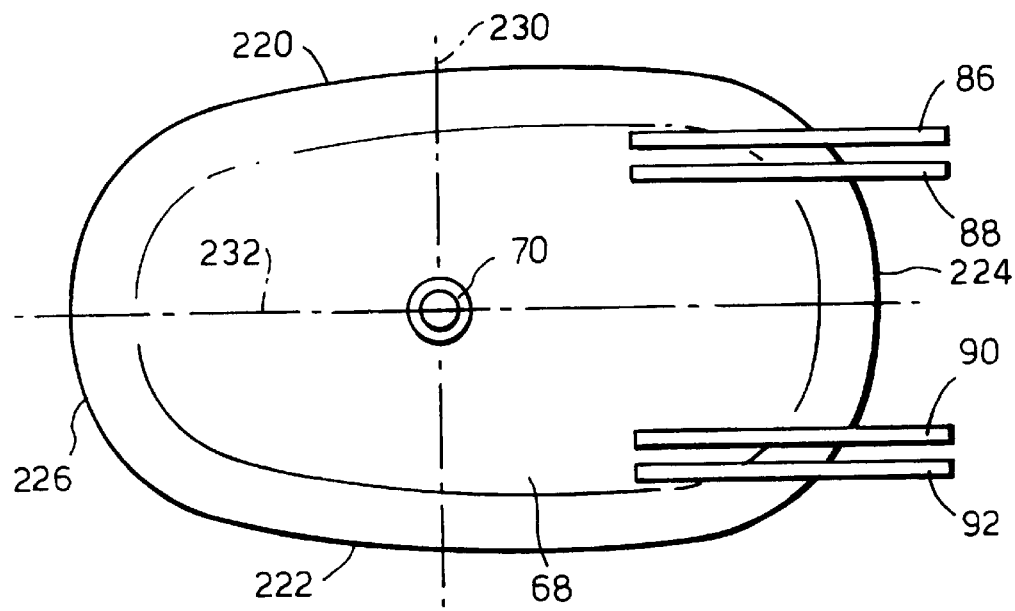
FIG. 13 is an elevational view from the front of the vehicle of a mirror glass carrier of the embodiment shown in FIGS. 11 and 12.

As can best be seen from FIG. 13, the mirror carrier 68 has an upper pair of mutually parallel arms 86, 88 and a lower pair of mutually parallel arms 90, 92 similar to the arms 32 and 34 shown in FIG. 3. The upper pair of arms 86, 88 have grooved regions for engagement with the upper lead screw 82 while the lower pair of arms has grooved regions for engagement with the lower lead screw 84. Each pair of arms has a respective U-shaped spring 94, 96 for urging the ends of the arms into engagement with the respective lead screws 82 and 84.

Each of the lead screws operates in a similar manner to that described with reference to FIGS. 8 and 9. Rotation of both lead screws 82 and 84 in the same direction causes adjustment of the orientation of the mirror carrier 68 about a generally vertical axis. Rotation of the two lead screws 82 and 84 in opposite directions to one another causes variation in the orientation of the mirror carrier 68 about a generally horizontal axis.

Figure 6:
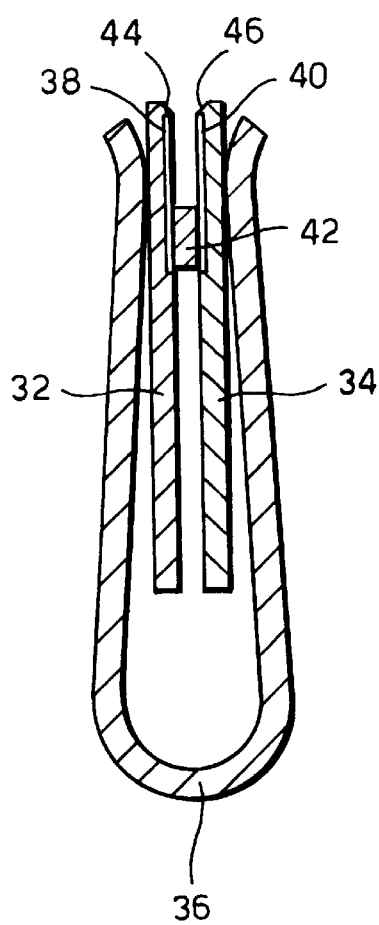
FIG. 6 a partial cross-sectional view taken on the line 6—6 in FIG. 5.

The case 60 has a pair of stop bars, one of which is visible at 98 in FIG. 12 which engage between the respective pairs of arms 86, 88 and 90, 92 when the case 60 is displaced forwardly or rearwardly in a similar manner to that described with reference to FIGS. 5 to 7. The vertical thickness of these stop bars is substantially less than the diameter of the lead screws 82 and 84 so as to avoid any risk of the grooved formations thereon coming into engagement with the grooved regions 38 and 40 of the arms 88–92 during adjustment of the orientation of the mirror carrier 68 about said generally horizontal axis.

With reference to FIG. 4, mirror carrier 18 has an outer periphery that includes top and bottom peripheral portions 120, 122, and opposite side peripheral portions 124, 126. These peripheral portions of carrier 18 also define corresponding peripheral portions of reflective member 16. In the embodiment of FIGS. 11 to 14, these peripheral portions of reflective member 66 and its carrier 68 are identified by numerals 220, 222, 224 and 226. In the embodiment of FIGS. 11–14, reflective member 66 and its carrier 68 are capable of angular movement about both vertical and horizontal axes that are illustrated at 230, 232 in FIG. 13, and may be referred to as first and second orthogonal axes.

Generally vertical axis 25 may be vertical, inclined within a vertical plane, and/or inclined out of a vertical plane. As previously mentioned, one way of determining a desirable angle of inclination for axis 25 is explained in EP-A-9272047. However, it will be recognised that other ways of determining a desirable angle can be used.

Reflective member 16 and its carrier 18 rotate clockwise and counterclockwise about axis 25. The midpoint position of movement is illustrated in FIGS. 2 and 10, while the clockwise end limit position of movement is illustrated in FIG. 9. The opposite or counterclockwise end limit position of movement is counterclockwise from the midpoint position of FIGS. 2 and 10, and the end portions of arms 32, 34 would be located adjacent the opposite end portion of lead screw 30 as compared to the clockwise end limit position of FIG. 9.

In the arrangement shown, side peripheral portion 124 of reflective member 16 and its carrier 18 travel in an arcuate path adjacent to bracket or attaching portion 12. In the arrangement illustrated, the arcuate path is around 20° which is around 10° in each of opposite directions from the midpoint position of FIGS. 2 and 10. The arcuate path could extend anywhere from 10° to 40° which would be between 5° and 20° in each of opposite directions from the midpoint position of FIGS. 2 and 10.

Depending on the orientation of axis 25, a given point on side peripheral portion 124 may travel in an arcuate path that is within a horizontal plane or is inclined relative to a horizontal plane. Lead screw 30 extends in the general direction of movement of side peripheral portion 124 or in the general direction of the arcuate path. The arcuate path is closest to the screw in the midpoint position of the mirror and is further away from the screw in the end limit positions of the mirror. Considering a given point on side peripheral portion 124 that is horizontally aligned with the longitudinal axis of lead screw 30 in the midpoint position of FIGS. 2 and 10, the axis of the lead screw is usually parallel to a line that is tangent to the arcuate path through which the given point travels.

The longitudinal axis of lead screw 30 usually would be inclined at an included angle with the plane of bracket inner face 14 of 25° to 45° and more preferably 30° to 40°. In the arrangement shown, the angle is about 35°. Lead screw 30 may also be horizontal or inclined above or below a horizontal plane. When inclined to the horizontal the angle of inclination is within 20° in each of opposite directions from the horizontal and more preferably within 10° either above or below the horizontal.

Reflective member or mirror 16 is shown as having a curved outer surface at a very large radius but it could be flat. With the curvature flattened or removed, the mirror outer surface has a surface plane. Therefore, references to the mirror as having a surface plane does not necessarily mean that the mirror surface is flat or plane.

In the midpoint position of the mirror and carrier shown in FIGS. 2 and 10, the longitudinal axis of lead screw 30 could extend perpendicular to the mirror plane or could be inclined relative thereto. When inclined, the angle of inclination preferably is not greater than 35° in horizontal or vertical planes. Thus, the axis of lead screw 30 could be inclined up to 35° in a horizontal plane in either of opposite directions from a line that is perpendicular to the mirror plane, and could be inclined up to 35° in a horizontal plane in either of opposite directions from a line that is perpendicular to the mirror plane, and could be inclined up to 35° in a vertical plane in either of opposite directions from a line that is perpendicular to the mirror plane. With the lead screw so inclined, the projected length of the lead screw that extends perpendicular to the mirror plane is equal to the length of the lead screw times the cosine of the angle between 0° and 35°. The cosine of 35° is 0.81915 so that approximately 82% of the length of the lead screw extends in a direction perpendicular to the mirror plane when the lead screw is inclined at 35°. For purposes of this application, the length of the lead screw may be resolved into components that extend both parallel and perpendicular to the mirror plane in the midpoint position of the mirror. The parallel component is equal to the lead screw length times the sine of the inclination angle, and the perpendicular component is between 80% and 100% of the total lead screw length.

The position, inclination or lack of inclination of the lead screw with respect to the mirror also may be considered with respect to the directional components. When the longitudinal axis of the lead screw extends in a direction that is perpendicular to the mirror plane in the midpoint position of the mirror between its opposite end limits of travel, the directional component of the axis that is perpendicular to the mirror plane is 100%. When the longitudinal axis of the screw is inclined to the surface plane of the mirror in its midpoint position in a direction that forms an included angle of 35° with a line that is perpendicular to the surface plane of the mirror, the directional component that is perpendicular to the mirror plane is equal to the cosine of 35° or about 82%. Thus, in the midpoint of the mirror between its opposite end limits of travel, the longitudinal axis of the lead screw is oriented in a direction such that its directional component that is perpendicular to the mirror plane is between 80 and 100% or greater than 80%.

The principal directional component of the direction in which the shaft extends is one that extends perpendicular to the surface plane of the mirror. This principal directional component is at least 80% of the direction that is resolvable into components extending both parallel and perpendicular to the surface plane of the mirror.

The arrangement described with ridges on the arms engaging the lead screw permits relative transverse movement between the arms and screw as the distance between the mirror axis 25 and the point of engagement between the screw and arms varies during movement of the arms along the screw.

Lead screw or worm gear 30 may be considered an elongated rotatable shaft that co-operates with followers define by arms 32, 34 to convert rotary motion of the shaft to motion of the arms linearly along the shaft. Other motion conversion arrangements are possible such as a smooth shaft co-operable with skewed rollers attached to the follower arms, or a grooved shaft co-operable with small balls attached to the follower arms. In such arrangements, the rollers or balls would be on a part to which the arms are attached to import swinging motion of the arms as the part moves along the shaft while permitting relative movement between the part and the arms in a direction transversely of the shaft longitudinal axis.

What is claimed is:

1. A rear view mirror assembly comprising a bracket portion adapted to be mounted on a vehicle body, a case extending outwardly from said bracket portion, a reflective member having a surface plane and being mounted in said case for angular movement relative thereto between opposite end limit positions and having a midpoint position, a drive unit including a rotatable shaft having a longitudinal axis and being mounted in said bracket portion, with said axis oriented in a direction having a principal directional component that is at least 80% of said direction and extends perpendicular to said plane when said reflective member is in said midpoint position, a follower projecting laterally from said reflective member beyond said outer periphery thereof into engagement with said shaft, said shaft and follower being co-operatively shaped to convert rotary motion of the shaft into linear movement of the follower along the shaft so that rotation of the shaft imparts angular movement to said reflective member.

2. A rear view mirror assembly according to claim 1, wherein said bracket portion and said case are separate members and said case is mounted on said bracket portion for displacement of the case relative to said bracket portion in response to a predetermined displacement force, and said follower is disengageable from said shaft when said case is displaced relative to said bracket portion.

3. A rear view mirror assembly according to claim 2, wherein said case includes a bar engageable by said follower to inhibit angular movement of the reflective member when the follower is disengaged from said shaft.

4. A rear view mirror assembly according to claim 1, further comprising a resilient device urging said follower into engagement with said shaft.

5. A rear view mirror assembly according to claim 1, wherein said follower comprises a pair of arms between which said shaft is received.

6. A rear view mirror assembly according to claim 5, including a U-shaped spring within which said arms are received to urge said arms towards one another.

7. A rear view mirror assembly according to claim 1, wherein said reflective member is mounted for angular movement relative to said case about first and second orthogonal axes, said drive unit including a pair of rotatable shafts and said follower including a pair of arms engaging said shafts at locations spaced from one another, simultaneous rotation of said shafts in the same direction imparting angular movement to said reflective member about the first axis and simultaneous rotation thereof in opposite directions imparting angular movement to said reflective member about the second axis.

8. A rear view mirror assembly according to claim 7, wherein said shafts have longitudinal axes that are parallel to one another.

9. A rear view mirror assembly of claim 1 wherein said shaft comprises a lead screw and said follower has a ridge formation thereon engaging said lead screw.

10. A rear view mirror assembly having an attaching portion for attaching said mirror assembly externally of a vehicle, a mirror case extending outwardly from said attaching portion, a mirror having a surface plane and an outer periphery that includes a side peripheral portion, said mirror being mounted in said case for angular adjustment relative to said case and with said side peripheral portion located adjacent to said attaching portion for movement in an arcuate path during angular adjustment of said mirror, a drive unit mounted in said attaching portion for imparting angular movement to said mirror, said drive unit including a rotatable shaft having a longitudinal axis extending generally in the direction of said arcuate path, said mirror including a follower extending outwardly therefrom beyond said side peripheral portion into engagement with said shaft, and said shaft and said follower being co-operatively shaped to convert rotary motion of said shaft into motion of said follower along said shaft to impart angular movement to said mirror.

11. The mirror assembly of claim 10, wherein the shaft longitudinal axis extends in a direction having a principal directional component that is at least 80% of said direction and extends perpendicular to the mirror surface plane when said mirror is in a midpoint position.

12. The mirror assembly of claim 10, wherein said attaching portion and said case comprise a unitary assembly.

13. The mirror assembly of claim 10, wherein said attaching portion and said case are separate members and said case is connected with said attaching portion for providing swinging movement of said case relative to said attaching portion.

14. The mirror assembly of claim 13, wherein said follower is separable from said shaft upon swinging movement of said case relative to said attachment portion.

15. The mirror assembly of claim 14, wherein said case includes a keeper engageable by said follower upon separation thereof from said shaft to inhibit angular movement of said mirror relative to said case.

16. The mirror assembly of claim 10, wherein said mirror is mounted in said case for angular adjustment relative thereto about a pair of orthogonal axes, said drive unit including a pair of spaced-apart rotatable shafts and said follower including a pair of spaced-apart arms engaging said shafts, said shafts and arms being cooperatively formed to convert rotation of said shafts into movement of said arms along said shafts, rotation of said shafts in the same direction imparting angular movement of said mirror about one of said orthogonal axes, and rotation of said shafts in opposite directions imparting angular movement to said mirror about the other of said orthogonal axes.

17. A rear view mirror assembly having a mounting base for mounting said assembly externally of a vehicle, a mirror case attached to said mounting base and having a mirror mounted therein for selective angular movement relative thereto, said mirror case being releasably swingable relative to said mounting base when a force is applied thereto in directions from the front or rear of the vehicle, a drive unit mounted in said mounting base, said drive unit including an elongated rotatable drive shaft extending transversely of said mirror and having a longitudinal axis, a follower on said mirror drivingly engaging said shaft and movable along said shaft during rotation of said shaft to effect angular adjustment of said mirror, a separable connection between said follower and said shaft that separates upon swinging movement of said case relative to said mounting base, and said separable connection being separable in a direction that extends transversely of said longitudinal axis.

18. The mirror assembly of claim 17, wherein said case includes a keeper engageable by said follower upon separation thereof from said shaft to inhibit movement of said mirror relative to said case.

19. The mirror assembly of claim 17, wherein said follower is movable out of engagement with said shaft upon swinging movement of said mirror case to define said separable connection.

20. The mirror assembly of claim 17, wherein said mirror has an outer periphery that includes a side peripheral portion located adjacent said drive shaft, said side peripheral portion being movable in an arcuate path during angular movement of said mirror, and said longitudinal axis of said shaft extending in the general direction of said arcuate path.

21. The mirror assembly of claim 20, wherein said longitudinal axis of said shaft is substantially parallel to a line that is tangental to said arcuate path.

* * * * *